(12) United States Patent
Sulzer et al.

(10) Patent No.: US 9,273,870 B2
(45) Date of Patent: Mar. 1, 2016

(54) ROOM ENCLOSURE ASSEMBLY, METHOD FOR PRODUCING SAME AND ELEMENT THEREFOR

(75) Inventors: Hans Dietrich Sulzer, Herrliberg (CH); Eric Sulzer, Baden (CH)

(73) Assignee: H.D.S. TECHNOLOGY AG, Herrliberg (CH)

( * ) Notice: Subject to any disclaimer, the term of this patent is extended or adjusted under 35 U.S.C. 154(b) by 0 days.

(21) Appl. No.: 14/005,052

(22) PCT Filed: May 1, 2012

(86) PCT No.: PCT/CH2012/000095
§ 371 (c)(1),
(2), (4) Date: Nov. 8, 2013

(87) PCT Pub. No.: WO2012/149659
PCT Pub. Date: Nov. 8, 2012

(65) Prior Publication Data
US 2014/0060775 A1   Mar. 6, 2014

(30) Foreign Application Priority Data

May 4, 2011   (CH) ........................................ 763/11

(51) Int. Cl.
*F24D 3/14* (2006.01)
*E04B 9/00* (2006.01)
*F24F 5/00* (2006.01)

(52) U.S. Cl.
CPC . *F24D 3/148* (2013.01); *E04B 9/00* (2013.01); *F24D 3/14* (2013.01); *F24F 5/0089* (2013.01); *F24D 2220/006* (2013.01); *Y10T 29/4935* (2015.01); *Y10T 29/49629* (2015.01)

(58) Field of Classification Search
CPC .......... E04C 2/3405; E04C 2/32; E04C 2/34; E04C 2/288; E04C 2/326; E04C 2002/3444; E04C 2002/345; E04C 2002/3461; E04C 2002/3466; E04C 2002/3472; E04B 9/001; E04B 9/0442; E04D 13/1643; E04D 13/165
USPC ............. 52/630, 302.1, 782.1, 783.1, 783.15, 52/783.16, 506.02–506.05, 515, 506.06, 52/506.07, 783.11, 783.17, 783.18, 783.19
See application file for complete search history.

(56) References Cited

U.S. PATENT DOCUMENTS 2,220,596 A * 11/1940 Bernhardt ...................... 428/186
2,262,899 A * 11/1941 Mechlin .......................... 264/35

(Continued)

FOREIGN PATENT DOCUMENTS

| CH | 313931 A | 5/1956 |
|---|---|---|
| DE | 972926 C | 11/1959 |

(Continued)

OTHER PUBLICATIONS

International Search Report PCT/ISA/210 for International Application No. PCT/CH2012/000095 Dated Apr. 26, 2013.

*Primary Examiner* — Elizabeth A Plummer
*Assistant Examiner* — Kyle Walraed-Sullivan
(74) *Attorney, Agent, or Firm* — Harness, Dickey & Pierce, P.L.C.

(57) ABSTRACT

A room enclosure assembly on a base of a concrete ceiling or wall is disclosed. In an embodiment, it includes metal sheet material having contact surfaces toward the base and web faces leading away from the base and heat exchange surfaces. Folding regions are formed between the sub-faces of the sheet material. The contact surfaces are fastened to the base area via a heat conducting connection layer. The heat-exchange faces are provided with a coating layer. The heat flow between the base and the heat exchange surfaces is especially efficient because it takes place in the continuous metal sheet material. Through-openings in the heat exchange surfaces, together with the use of a suitable coating layer on the heat exchange surfaces, allow for the acoustic insulating effect and optical appearance to be optimized.

18 Claims, 3 Drawing Sheets

(56) References Cited

U.S. PATENT DOCUMENTS

| | | | | |
|---|---|---|---|---|
| 2,294,890 A * | 9/1942 | Brinker | | 52/783.11 |
| 2,771,164 A * | 11/1956 | Scurlock | | 52/404.1 |
| 3,103,255 A * | 9/1963 | Boschi et al. | | 181/293 |
| 3,270,103 A * | 8/1966 | Kurtz | | 264/45.4 |
| 3,295,278 A * | 1/1967 | Muhm | | 52/223.6 |
| 3,542,636 A * | 11/1970 | Wandel | | 428/178 |
| 3,802,147 A * | 4/1974 | O'Konski | | 52/630 |
| 3,819,466 A * | 6/1974 | Winfield et al. | | 428/175 |
| 3,971,184 A * | 7/1976 | Van Wagoner | | 428/201 |
| RE29,517 E * | 1/1978 | Becker | | 52/144 |
| 4,181,556 A * | 1/1980 | Fehlmann | | 264/171.16 |
| 4,223,053 A * | 9/1980 | Brogan | | 428/34.5 |
| 4,297,820 A * | 11/1981 | Artzer | | 52/309.11 |
| 4,486,996 A * | 12/1984 | Alejos | | 52/309.11 |
| 4,558,550 A * | 12/1985 | Marchais et al. | | 52/309.7 |
| 4,706,432 A * | 11/1987 | Fishburn | | 52/407.1 |
| 4,736,561 A * | 4/1988 | Lehr et al. | | 52/410 |
| 5,088,259 A * | 2/1992 | Myers | | 52/410 |
| 5,172,527 A * | 12/1992 | Ault | | 52/145 |
| 5,256,467 A * | 10/1993 | Kato | | 428/182 |
| 5,259,157 A * | 11/1993 | Ault | | 52/145 |
| 5,487,248 A * | 1/1996 | Artzer | | 52/309.12 |
| 5,584,153 A * | 12/1996 | Nunley et al. | | 52/410 |
| 5,685,124 A * | 11/1997 | Jandl, Jr. | | 52/783.11 |
| 5,740,649 A | 4/1998 | Fuchs et al. | | |
| 5,832,685 A * | 11/1998 | Hermanson | | 52/506.07 |
| 5,947,817 A * | 9/1999 | Morris et al. | | 454/365 |
| 6,067,764 A * | 5/2000 | Johansen | | 52/302.1 |
| 6,923,248 B1 | 8/2005 | Weber et al. | | |
| 7,051,489 B1 * | 5/2006 | Swiszcz et al. | | 52/783.18 |
| 7,067,588 B2 * | 6/2006 | Ritter et al. | | 525/268 |
| 7,454,876 B2 * | 11/2008 | Kelly | | 52/746.11 |
| 7,658,005 B2 | 2/2010 | Sulzer | | |
| 7,841,148 B2 * | 11/2010 | Tonyan et al. | | 52/483.1 |
| 7,963,085 B2 * | 6/2011 | Sypeck et al. | | 52/782.1 |
| D655,022 S * | 2/2012 | Ryan | | D25/121 |
| 2003/0041547 A1 * | 3/2003 | Gosselin | | 52/630 |
| 2003/0106275 A1 * | 6/2003 | Kennedy | | 52/506.02 |
| 2004/0003559 A1 * | 1/2004 | Minke et al. | | 52/309.9 |
| 2004/0041547 A1 * | 3/2004 | Asano | | 323/274 |
| 2004/0074206 A1 * | 4/2004 | Tanase et al. | | 52/783.17 |
| 2005/0229535 A1 * | 10/2005 | Garner et al. | | 52/783.11 |
| 2006/0053702 A1 * | 3/2006 | Kelly | | 52/90.1 |
| 2007/0094964 A1 * | 5/2007 | Stender | | 52/302.1 |
| 2008/0083183 A1 * | 4/2008 | Rymell et al. | | 52/408 |
| 2008/0271400 A1 * | 11/2008 | Raidt et al. | | 52/408 |
| 2009/0199892 A1 * | 8/2009 | Farquhar | | 136/248 |
| 2010/0287863 A1 * | 11/2010 | Goldberg et al. | | 52/302.1 |
| 2011/0005165 A1 * | 1/2011 | Stadthagen-Gonzalez | | 52/783.1 |
| 2011/0099926 A1 * | 5/2011 | Garcia Fernandez | | 52/220.1 |
| 2012/0272590 A1 * | 11/2012 | Goldberg et al. | | 52/169.14 |
| 2012/0285116 A1 * | 11/2012 | Walker | | 52/741.4 |

FOREIGN PATENT DOCUMENTS

| | | |
|---|---|---|
| DE | 3919862 A1 | 12/1990 |
| DE | 4243426 A1 | 6/1994 |
| DE | 19636944 A1 | 11/1997 |
| DE | 102005012754 A1 | 9/2006 |
| DE | 202007017185 U1 | 4/2008 |
| EP | 0697051 B1 | 1/1997 |
| EP | 2306135 A1 | 4/2011 |
| WO | WO-0159371 A1 | 8/2001 |
| WO | WO-2004008032 A1 | 1/2004 |

* cited by examiner

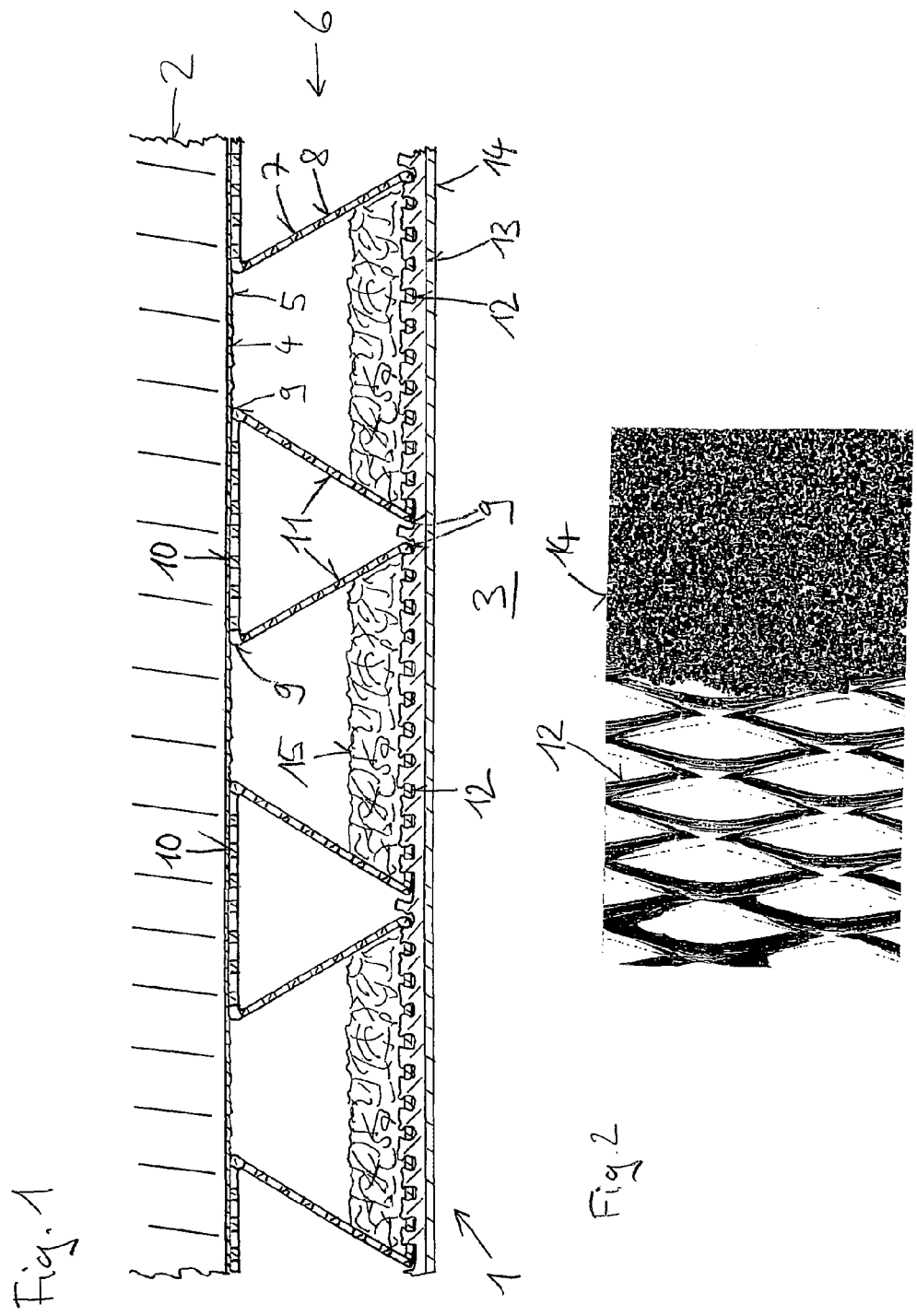

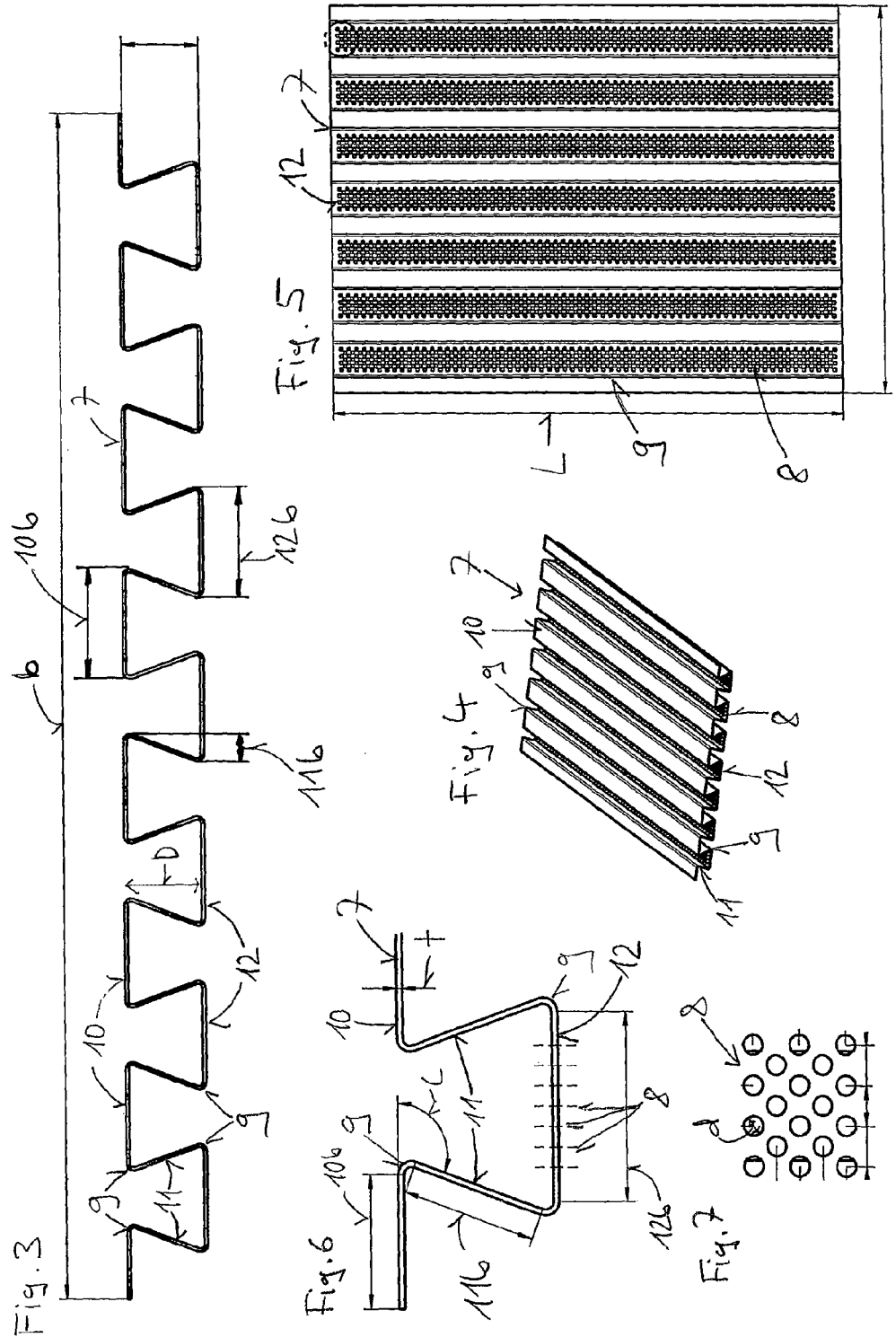

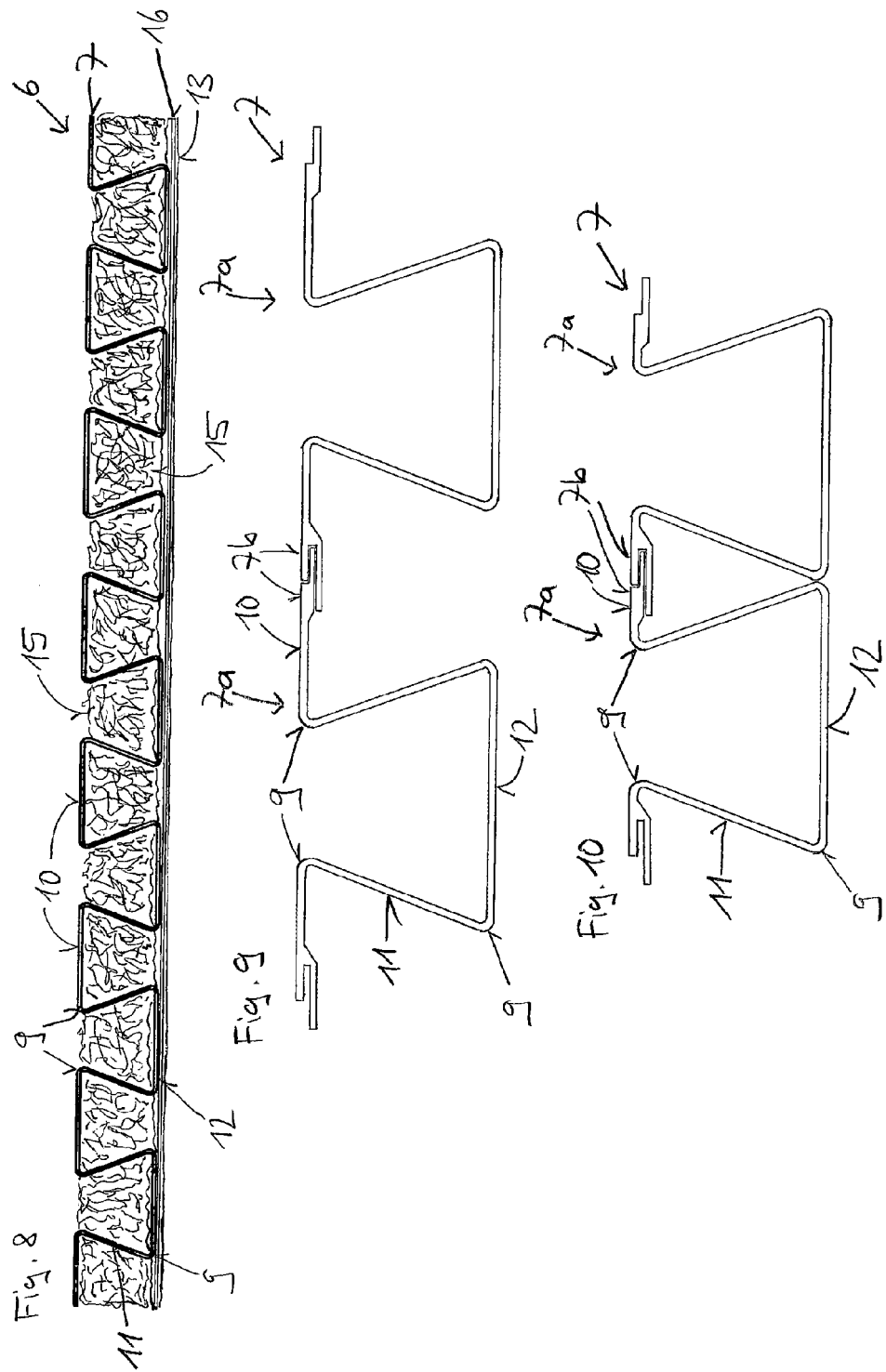

ROOM ENCLOSURE ASSEMBLY, METHOD FOR PRODUCING SAME AND ELEMENT THEREFOR

The invention relates to a room enclosure assembly according to the preamble of claim 1, to a method for producing same according to the preamble of claim 11 and to a heat transfer element therefor according to the preamble of claim 13.

Pipings or cooling or heating elements, respectively, are attached in and on walls or ceilings of rooms, which only require a small cooling or heating output. In the operating state, a heating or cooling medium, preferably a liquid, but also a gas, if applicable, is conveyed through the piping. Due to the fact that the cooling or heating output, respectively, of such elements is often relatively low, the pipings can be arranged behind a visible surface. In the case of suspended ceilings, cooling or heating coils comprising pipes, which lead from an inlet connection to an outlet connection, are placed onto the ceiling elements, so that they are located on the side of the ceiling elements, which face away from the room. The side of the ceiling elements, which faces the room, can radiate heat or absorb heat radiation in accordance with the prevailing temperature distribution.

In addition to the piping on the suspended ceilings, plaster ceilings, into which pipings are inserted, are also known. For this purpose, cardboard panels, which are coated with plaster, for example, are fastened to the ceiling or to a structure, which hangs from the ceiling. A piping is adhered to the plaster surface and plaster is subsequently applied to the extent that the piping is covered. Pipings can also be adhered to walls and can subsequently be covered with a plaster layer. To cover the piping, plaster must be applied, which is associated with corresponding effort.

Panels comprising a pipe, which is inserted into a duct, can be assembled as finished elements, so that at least the adhesion of the pipes and the application of a coating layer, which covers the pipes, are eliminated. At the location where such a heat exchanger element is assembled, a connecting possibility comprising an inlet pipe and an outlet pipe must be present. The pipes of the element are connected to the connecting pipes via connecting pieces, for example clamping sleeves. The region comprising the connecting pipes or connections, respectively, is then closed by means of a cover. These panels comprising pipes, which are inserted on the rear side, have different disadvantages. For example, they can thus only cover small wall or also ceiling areas, if applicable. In addition, they are custom products, the sizes of which must be adapted to the respective conditions. The heat or cooling output, respectively, must be attained through the massive panel, which is associated with a reduction of the efficiency. This reduced efficiency leads to a reduced heat flow between interior and heat exchanger pipes, which additionally also competes with the undesirably high heat flow through the wall.

A solution in sandwich construction is known from DE 196 36 944, in the case of which cooling pipe coils are inserted between two dry construction panels. These elements are installed next to one another in a grid-like manner so as to provide for a cooling ceiling. To integrate the cooling pipe coils into cooling circuits, provision is made above the sandwich elements for an inlet pipe, an outlet pipe and connecting pipes. In the contact region of the elements, which connect to one another, joints, which are puttied or covered with an adhesive, if applicable, appear on the bottom side of the cooling ceiling. These sandwich elements are associated with an costly assembly, because they are heavy and require a free space above the cooling ceiling for the mentioned pipes. The production of the elements is very costly, because two dry construction panels must be assembled at a desired distance to one another and because the cooling pipes must be inserted in advance. Further elements would have to be used for sound absorption.

A panel, which is made in a mold and which comprises a small inserted plastic tube, is known from DE 42 43 426. The pourable compound for producing the panel consists of sand, which is mixed with a liquid binding agent. The production of the poured panel is very costly, in particular because the small tubes must be held in the correct position when the pourable compound is poured in. So that the panels encompass a sufficiently high stability for the transport and for the assembly, they must encompass a minimum thickness, which leads to an undesirably large weight in the case of larger panels. According to the large weight, the assembly on the ceiling is costly and highly resilient connections to the ceiling must be embodied. Individual panels, which are assembled on a ceiling or a wall, appear like foreign objects. In addition, connecting pipes must be installed to the region of the panel.

WO2004/008032A1 describes a solution, in the case of which heat exchanger elements comprising at least one heat exchanger pipe are used for providing a heat exchange boundary surface of a room. The elements are panel-shaped and comprise a fiber mat. A coating layer adheres to the fiber mat and the heat exchanger pipe runs at least partially in the coating layer. The fiber mat acts as insulation. It is ensured through this that the major part of the heat flow from and to at least one heat exchanger pipe occurs through the coating layer, thus between interior and pipe. A large assembly effort is created due to the fact that the pipe of all of the heat exchanger elements must be connected to a heat exchange circuit during assembly.

More recent solutions for the temperature compensation in interiors use the concrete mass of the ceiling or of the walls, if applicable, as storage. The pipes for the heat transfer fluid are arranged directly in the concrete mass. For heating purposes, the concrete mass is brought to a temperature, which is slightly above the desired room temperature and, for cooling purposes, it is brought to a temperature, which is below the desired room temperature. Due to the fact that the concrete mass forms an inert storage, a balance can already be created passively within 24 hours. If applicable, an active heating or cooling of the concrete mass can be made during off-peak tariff periods. To be able to ensure the desired heat transfer between interior and concrete mass, the concrete mass must come into contact with the interior across a sufficiently large surface. Open concrete surfaces can have acoustically and esthetically unpleasant effects. To fulfill acoustic demands, acoustic absorbing surfaces, mostly elements, which are suspended from the ceiling, are installed. These elements limit the open raw ceiling portion and reduce the heat exchange.

There are solutions, in the case of which perforated plates, which are suspended from the ceiling, form heat exchange surfaces, which face the interior and which ensure a heat exchange to the interior directly via radiation and convection. The perforated plates are connected to the concrete ceiling via profiles, which have an H-shaped cross section. Acoustic mats are placed onto the perforated plates in the gap between the perforated plates and the concrete ceiling. The heat exchange is not optimal and the perforated plate surfaces are optically unattractive.

Due to the lack of solutions according to the state of the art, the invention is based on the task of finding a solution, which is simple with reference to the design, the assembly and the elements, which are used, which ensures a high heat flow and which is optically pleasing as well as sound-absorbing.

This task is solved by means of the features of claim 1 or 11, respectively, or 13. The dependent claims describe alternative or preferred embodiments, respectively.

The room enclosure assembly according to the invention on a base area of a building structure comprises heat exchange surfaces, spaced from the base area and fastened to the base area by means of connections. The heat exchange surfaces are provided with a coating layer, preferably with an air-permeable coating layer, and the heat exchange surfaces as well as the connections between the heat exchange surfaces and the base area are formed from a continuous metallic sheet material comprising through openings. The sheet material comprises contact surfaces to the base area, web faces, which lead away from the base area, as well as heat exchange surfaces, wherein folding regions are embodied between these sub-faces of the sheet material.

In solving the task, it was recognized that the heat flow between the base area and the heat exchange surfaces is particularly efficient, when it takes place in a continuous metallic sheet material. By eliminating the contact transitions between connecting elements and heat exchange surfaces, the heat coupling between a base area on the building side and a heat exchange surface, which is spaced apart therefrom, can be improved and the assembly can be simplified. Continuous metal ware from the base area to the heat exchange surfaces exists in the continuous metallic sheet material. Together with the use of an air-permeable coating layer on the heat exchange surfaces, through openings in the heat exchange surfaces allow for the optimization of the acoustic absorbing effect and of the optical appearance. This is why the metallic sheet material has through openings at least at the heat exchange surfaces.

Expanded metal, for example, is used as metallic sheet material. Expanded metal can be made easily and is correspondingly cost-efficient. Due to the fact that the sub-faces of the expanded metal, which run around the through openings, are not located in a common plane, they can contribute to a good adhesion of the applied coating. The holding of the coating on the expanded metal is thus at least partially created as positive holding by surrounding sub-faces of the expanded metal, which have different orientations. For good heat absorption on the base area, however, the layer thickness of a heat-conducting connecting layer (adhesive or mortar) must be chosen to be large, when the sub-faces of the expanded metal are not located in a common plane. To already obtain a good heat transition between base area and expanded metal with a small layer thickness of the connecting layer, at least the contact surfaces to the base area are preferably rolled flat, but if applicable the entire expanded metal.

Different heat-conducting adhesives or mortars are available on the market. For example, a quick-drying mineral adhesive mortar with the name Sto-Baukleber-QS (STO-construction adhesive-QS) can be used.

Embodiments, in the case of which perforated plates, grids, wire meshes or wire cloths are used, are also possible. On the one hand, perforated plate has the advantage that the through openings can specifically be positioned only in the regions of the heat exchange surfaces. On the other hand, perforated plate has the disadvantage that it is more expensive compared to expanded metal and that the adhesion of the coating layer can be limited. In the case of metallic surfaces, to which the coating does not adhere well, an adhesive agent can be applied. In the case of grids, the production process is also more costly than in the case of expanded metal. In the event that sheet material comprising small through openings is desired, wire meshes and in particular wire cloths can be advantageous, wherein the adhesion of the coating is then attained to a lesser extent. It goes without saying that wire meshes and wire cloths comprising larger through openings can also be used. At least a portion of the wires forms the desired continuous metal ware from the base area to the heat exchange surfaces. Good heat conduction can be ensured by selecting a sufficiently large wire diameter. The adhesion of the coating can also be improved by means of mold structures, which are pressed in. It would also be possible to make a metallic sheet material from metal wool, preferably aluminum wool, wherein the desired continuous metal ware from the base area to the heat exchange surfaces would not be present in the case of small chip lengths and the cross sections of the chips would hardly be sufficient for good heat conduction.

In response to the forming of sections of the metallic sheet material into elements comprising contact surfaces to the base area, web faces and heat exchange surfaces, it is practical to form the folding regions between these sub-faces of the sheet material by means of forming steps. Due to the fact that folding regions can have different shapes, the folding steps can be made by folding, bending or other forming steps. It can be advantageous, when different types of shape forming are combined. Folding regions are to thus be understood in a highly general sense as forming regions comprising arbitrary cross sectional shapes.

In the event that sheet material is processed from rolls, sections can thus first be severed, for example. These sections are formed individually into the desired elements. It can be advantageous thereby when a basic shape is embodied by means of molding or deep-drawing, respectively. This basic shape can be processed further by means of forming tools. Sheet material from rolls, however, can also be formed continuously into the desired shape, wherein sections of at least partially molded material are then severed. In response to the continuous forming, the sheet material is guided through a forming device comprising forming tools, for example forming rollers, and is thereby formed into the desired cross sectional shape.

In the case of metallic material, the form is significant, not the production method. Accordingly, the feature means that the heat exchange surfaces as well as the connections between the heat exchange surfaces and the base area are formed from a continuous metallic sheet material, that the metallic material of the contact surfaces, of the web faces and of the heat exchange surfaces is continuous and that it encompasses a small thickness compared to the length and width of the individual elements. The metallic material comprising the small thickness can be produced in different ways. In particular, an element of the metallic material can also consist of subcomponents, wherein the heat conduction, however, then takes place across flat subregions of the metallic material, which extend across the entire length of the element.

In the event that the folding regions between the contact surfaces to the base area and the web faces, which lead away from the base area, and/or the folding regions between the heat exchange surfaces and the web faces must form small angles between the respective adjacent surfaces, the forming of these folding regions can become very difficult in the case of a plurality of base areas or heat exchange surfaces, respectively, and the corresponding number of web faces. Extremely complex cross sectional shapes can be attained by means of extrusion molding. Even in the event that the curved regions between the web faces and the contact surfaces or the heat exchange surfaces, respectively, are no longer made by means of bending, these curved regions shall also be characterized as folding regions.

In the case of extrusion molding, the effort increases with the width of the elements, which are to be produced, so that this production method is suitable in particular for narrow elements. In the event that the produced elements comprise connecting regions, which run parallel to the folding lines on both sides, two or more individual elements can be connected to form a continuous metallic sheet material comprising heat exchange surfaces, web faces and contact surfaces. The connection of the connecting regions can be embodied as form-fit connection, for example as plug-in connection or as folded joint and as welded connection or adhesive connection. The connection is embodied such that the function of the heat exchange surfaces, web faces and contact surfaces is not impacted and that the assembled element encompasses a sufficient stability and the desired heat transfer characteristics.

The size of the through openings in the metallic sheet material is adapted to the coating, which is to be applied, and to the method for applying the coating. In the case of a preferred embodiment, sticky coating is applied to the heat exchange surfaces, in particular by means of brushing or spraying, if applicable. It is also possible to use a coating mixture comprising a fiber portion, wherein the fibers are to limit the passage of the coating through the through openings. It is possible to coat relatively large through openings with the coating. If applicable, a flat element, preferably a non-woven material, which limits the undesired passage of coating, is arranged on the rear side of the heat exchange surfaces prior to the application of the coating. A portion of the applied coating surrounds subregions of the boundaries of through openings. In the case of through openings, which encompass expansions of different sizes in two main directions, the expansion of the through openings is maximally 42 mm, in particular maximally 10 mm, in a first main direction, and maximally 8 mm, in particular maximally 5 mm, in a second main direction. In the case of through openings, which have substantially the same size in the two main directions, the diameter of the through openings is maximally 15 mm, in particular maximally 8 mm. In response to the use of perforated heat exchange surfaces, the preferred hole diameter is in the range of between 1 and 6 mm, in particular substantially 5 mm. The perforated surface portion on the heat exchange surfaces is between 2 and 30%, in particular substantially 25%.

The position and the surface portion of the through openings in the metallic sheet material are preferably adapted to optimize the heat flow and/or the sound absorption. In a preferred embodiment, only the heat exchange surfaces encompass through openings, so that the heat flow through the contact surfaces and the web faces is not limited by the through openings. Preferably, the through openings are embodied prior to the forming of the metallic sheet material in the region of the heat exchange surfaces, which are formed later, which can be attained, for example, by means of a simple stamping process. In the case of elements, which are already formed, in particular in the case of elements, which are produced by means of extrusion molding, the through openings can be embodied only at the profile-shaped elements, wherein matching support devices are then used when provision is possibly made for a stamping of holes. Embodiments comprising web faces without through openings encompass narrow cavity regions, which are separated from one another and the impact of which on the sound absorption differs from the embodiments comprising cavities, which are connected by through openings of the web faces.

Together with the through openings and the continuous pores of the coating layer, the cavity regions, which are separated by means of tight web faces, form Helmholtz resonators, which are separated from one another, in the case of the heat exchange surfaces. In the event that heat exchange surfaces, which have different widths, are embodied, provision can be made for resonators, which encompass absorption maxima in response to different frequencies. By specifically selecting the width of the heat exchange surfaces, desired frequencies can also be absorbed more strongly in the low frequency range, for example.

The metallic heat exchange surfaces encompass a substantially constant distance to the base area—or to a surface through the contact surfaces, respectively—wherein the distance is preferably in a range of between 10 mm and 80 mm, in particular between 25 mm and 45 mm.

The material thickness of the metallic sheet material is in a range of between 0.2 mm and 3 mm, but preferably in a range of between 0.5 mm and 1.8 mm, in particular substantially 1.5 mm. In the case of expanded metal, the thickness of the sheet, before it is slit and stretched, is preferably provided as material thickness.

A shape forming of the sheet, which shows dovetail-like shapes in a cutting plane vertically to the folding lines—which are assigned to the folding regions—is particularly advantageous. This means that the intersecting pipes of the web face pairs, which lead away from the base area or from the contact surfaces, respectively, and which are connected to one another via a heat exchange surface, diverge towards the heat exchange surface. Analogously, the intersecting pipes of the web face pairs, which lead away from the heat exchange surfaces and which are connected to one another via a contact surface, diverge towards the contact surface. Gaps can appear both between heat exchange surface, which connect to one another, and also between contact surfaces, which connect to one another.

To be able to apply a continuous coating layer onto the heat exchange surfaces, the gaps between the heat exchange surfaces are kept as small as possible. If applicable, however, these gaps are covered by means of a cover element, such that a continuous coating layer can be embodied. In the case of the coating layer, the cover element can be used as a continuous stability layer, wherein it goes without saying that it also encompass through openings for the desired sound absorbing characteristic. So that the heat exchange between the interior and the heat exchange surfaces is not limited to an undesirably high extent by means of the cover element, said cover element is made to be as thin as possible and in particular from material comprising a good heat conductivity, for example from metallic sheet material, such as a thin expanded metal, a grid, a wire mesh or a wire cloth. The cover element can adhere to the heat exchange surfaces via the coating layer, for example. If applicable, however, the cover element is fastened to the heat exchange surfaces prior to the application of the coating layer, for example via mechanical connections or welding and adhesive connections.

If applicable, the heat exchange surfaces connect directly to one another. In the sectional illustration, a contact surface, together with the two connecting web faces, then forms a triangle, two corner points of which are located at the base area and one corner of which is located on the heat exchange surfaces, which connect to one another. In the event that the contact surfaces also connect to one another directly or via a small gap, the contact surfaces, which connect to one another, as well as the heat exchange surfaces, which connect to one another, can in each case be connected to one another. A stable honeycomb element, in the case of which a coating layer, which is applied to the heat exchange surfaces, withstands a transport and the assembly substantially undamaged, is thereby also created with thin sheet material.

In the event that the heat exchange surfaces are wider than the base areas, the dovetail shape of the heat exchange surface with the two connecting web faces is open at the base area, which facilitates the introduction of fiber material, for example. According to the widths of the heat exchange surfaces and of the contact surfaces, different gaps can be embodied between the heat exchange surfaces and the contact surfaces. The width of the contact surfaces is preferably chosen such that a sufficient heat conducting contact is ensured between base area and the metallic sheet material. Due to the fact that the heat conductivity in the continuous sheet material is very large, the width of the contact surfaces can be embodied so as to be considerably narrower than the width of the heat exchange surfaces.

In preferred embodiments, the total surface of the contact surfaces corresponds to at least one-fourth, preferably at least half, in particular at least two-thirds, of the total surface of the heat exchange surfaces.

The interior angle between heat exchange surfaces and web faces, which connect to one another, or between contact surfaces and web faces, which connect to one another, is preferably larger than 45°. The required quantity of the sheet material can be reduced through this, in particular in the event that the total surface of the contact surfaces is smaller than the total surface of the heat exchange surfaces.

To improve the acoustic absorption effect, fibrous material or, if applicable, also grainy and flaky absorption material is arranged, if applicable, at least in subregions between the metallic heat exchange surfaces and the base area or the plane, respectively, with the contact surfaces. If applicable, fibrous material or absorption material, respectively, is arranged in the regions without heat exchange surfaces.

Due to the fact that the distance between the heat exchange surfaces and the base area is in the range of between 10 and 80 mm, the fibrous material has a thickness in the range of between 10-80 mm, but preferably of between 20-60 mm. The sound absorption can be increased towards lower frequencies with increasing thickness of the fibrous material. This applies in particular for the regions without heat exchange surfaces. In the case of preferred embodiments, fibrous material comprising a thickness of between 40-60 kg/m$^3$ is used, in particular stone or glass or mineral fibrous material, respectively.

The coating covers the metallic heat exchange surfaces towards the interior with a layer thickness of maximally 30 mm, but preferably maximally 10 mm. In the case of preferred exemplary alternatives, the coating layer of the heat exchanger elements has a thickness in the range of only between 0.3 and 5 mm, but preferably of between 0.5 and 3 mm. Preferably, heat transfer elements comprising a coating layer are produced. In response to the production operation, this coating layer is preferably ground so as to be flat and to a desired position relative to the contact surfaces of the heat transfer element. Due to the fact that the heat conduction of the coating is smaller than the heat conduction of the metallic heat exchange surfaces or of the metallic sheet material, respectively, and thus reduces the heat exchange, the layer thickness of the coating layer or the cover of the heat exchange surfaces, respectively, is kept as small as possible. Preferably, a microporous coating, in particular a BASWA-phon coating, which is available on the market, is used.

In response to the assembly of a wall assembly, metallic heat exchange surfaces are arranged so as to be spaced apart from the base area, wherein connections between the metallic heat exchange surfaces and the base area are embodied. The heat exchange surfaces as well as the connections between the heat exchange surfaces and the base area are formed from a continuous metallic sheet material, which, at least in the case of the heat exchange surfaces, comprises through openings, wherein the heat exchange surfaces, contact surfaces and web faces between the metallic heat exchange surfaces and the contact surfaces connect to one another at the sheet material via folding regions, the heat exchange surfaces are provided with a coating layer and a heat-conducting connecting layer is applied at least to subregions of the surface layer, with the contact surfaces being fastened to the base area via said connecting layer, so that the web faces lead away from the base area to the heat exchange surfaces.

According to the size of the base area and the heat transfer elements, a plurality of elements, which connect to one another and which comprise metallic heat exchange surfaces, contact surfaces and web faces are arranged on the base area. A coating layer is subsequently applied at least in contact regions between the elements, but preferably across the entire surface of all of the heat exchange surfaces, so that a continuous coating layer surface is created. Unevenness on the free surface of the coating layer can thus be compensated. In the event that the flat surface cannot solely be attained by applying a thin finishing layer, a grinding step and/or a further application step is carried out, if applicable, for a compensation layer, prior to applying a thin finishing layer.

Organic or inorganic binding agents are used to harden the coating layer. Even binding agents, which wet themselves, addition polymers, synthetic resin binding agents, dispersions that harden by eliminating water, for example, binding agents that harden in UV light, two-component binding agents or also binding agents comprising silicates or sodium silicate, respectively, or possibly cement can be used, for instance. To make it possible to produce the heat transfer element with a small expenditure of time, quick-binding binding agents are preferred, if applicable.

Even if the heat between the interior of the room and the heat exchange surfaces must only flow through a thin coating layer, it might be advantageous when the heat conductivity of the coating layer is increased, when the cavity portion in the coating is reduced and/or when a coating mass or an addition to the coating mass, respectively, comprising a high heat conductivity, is used. A coating comprising a grain portion can comprise aluminum hydroxide, for example, in particular aluminum orthohydroxide.

If applicable, two layers of coating comprising different grain portions are applied, preferably the system BASWA-phon Classic, in particular a first layer comprising a more coarse grain (for example comprising an average grain size of substantially 0.7 mm), if applicable, comprising a smaller specific density and a second layer, which is applied to the first layer and which comprises a finer grain (for example comprising an average grain size of essentially 0.3 mm), in particular comprising a larger density.

In response to the use of only one coating mixture, the grain portion encompasses an average grain size in the range of between 0.2 and 0.8 mm, but preferably of 0.5 or 0.7 mm, for example.

So that the elements can be handled easily, the main surface of a preferred rectangular element encompasses a length in the range of between 60 and 120 cm, preferably of substantially 80 cm and a width in the range of between 40 and 80 cm, preferably of substantially 60 cm. Due to the small total weight of an element, the adhesive forces, which are required between the elements and the ceiling, are small and can be ensured by means of an adhesive bond. Elements comprising a coating layer can be assembled next to one another on walls or ceilings so as to cover a large area. In the event that the joints between the coated elements are filled and the continuous coating surface is provided with a cover layer, a continuous inner surface is created. The surface, at which heat transfer elements are not required, can be piped with coated fiber mats, whereby the entire ceiling or wall, respectively, obtains a uniform appearance. By applying a cover layer, which extends across all of the elements, the recognition of the heat transfer elements can be avoided.

Subregions of the coating layer, in particular regions between the heat exchange surfaces, can have a sound-absorbing effect as elastic membrane regions in the low frequency range. Due to the fact that the coating layer and the heat exchange surfaces are air-permeable in the case of a preferred embodiment, a good sound absorption can also be attained in the mid-frequency and high-frequency range, wherein fibrous material, if applicable, is also used for this purpose at least in subregions of the heat transfer elements.

A deformable coating layer can be attained by means of synthetic resin binding agents or dispersion binding agents, respectively. In particular in the event that the grains of the coating mass are connected to one another only via thin elastic bridges, thus, for example, in the event that the binding agent portion is deep, it can be prevented that the coating layer is damaged due to deformations of the heat exchange surfaces.

It is also possible to assembly heat transfer elements without a coating layer to the base area and to first apply the coating layer only to the assembled heat exchange surfaces, wherein it is then more difficult to attain a substantially constant layer thickness. Preferably, the coating layer is sprayed onto assembled heat exchange surfaces as spray coating. In the case of large through openings in the metallic sheet material, a non-woven material, which limits the passage of the spray coating through the through openings, is preferably arranged in the metallic sheet material on the side of the heat exchange surfaces, which faces the base area. It is also possible to use a coating mixture comprising a fiber portion, wherein the fibers are to limit the passage of the coating through the through openings.

The room enclosure assembly according to the invention encompasses different variable parameters, which, in suitable combination, in each case result in different sound absorption characteristics.

Subregions of the coating layer between the heat exchange surfaces also act in a sound-absorbing manner as elastic membrane regions in the low-frequency range, wherein the thickness and elasticity of the coating layer, combined with a cover element, if applicable, and the spring characteristics of fibrous material, which in particular connects to the coating layer, determine the frequency of the absorption maximum. The absorption by means of the excitation of membrane oscillations is mostly limited to narrow frequency ranges.

Subregions of the coating layer in the case of the heat exchange surfaces comprising through openings act as relatively rigid microporous layers, wherein the rigidity is attained by means of the metallic heat exchange surfaces and the respective two-sided folding regions. The micro-porosity is attained by means of the continuous coating layer pores in the through openings. The pore length corresponds to the thickness of the coating layer and the pore cross section is a function of the grain sizes and the binding agent portion of the coating layer. It can roughly be assumed that the average diameter of the continuous pores is in the size range of the average grain size, thus in the range of between 0.2 and 0.8 mm in the case of the preferred coating layers. Due to the fact that the pore diameter is clearly smaller than the thickness of the coating layer, an absorbing effect is attained, which is similar to the absorption with a micro-perforated plate, which is described in EP 0 697 051 B1. However, it turned out that the elimination of porous or fibrous material in the cavity or on the panels, which is required in EP 0 697 051 B1, negatively limits the optimization of the sound absorption. In particular the absorption degree is thereby relatively high only within narrow frequency ranges.

Together with fibrous material in the cavity between the base area and the heat exchange surface, the porous coating layer in the case of a heat exchange surface comprising through openings, which is spaced apart from the base area via the web faces, can be designed such that a broadband high sound absorption is attained in the frequency range of between 125 Hz and 4 kHz. It is a significant acoustic advantage of the instant solution that the increased absorption can be attained across a large frequency range. For a high and broadband absorption with the absorption maximum in a desired frequency range, the pore diameter, the portion of the sum of the pore cross sectional surfaces on the total surface, the thickness of the coating layer, the distance of the heat exchange surface from the base area and the through-flow resistance of the fibrous material in the region between the heat exchange surface and the base area must be chosen so as to be matched optimally to one another, preferably in the above-specified ranges. The absorption, which is created, can be explained as modified Helmholtz resonator absorption, in response to which the oscillation of the air in the continuous pores of the coating layer is cushioned by the air in the cavity between the heat exchange surface and the base area in the case of the heat exchange surface. The cushioning characteristic influences the excitable oscillations or the frequencies, respectively, comprising an increased absorption, wherein the absorption of the oscillations is effected by the air friction in the pores and, if applicable, in the fibrous material of the cavity.

In the case of a preferred solution, the system of porous coating layer and metallic heat exchange surface comprising through openings encompasses a flow resistance R in the range of between 500 and 1300, but in particular of between 800 and 1000 (Pa*s)/m, which follows from the thickness of the coating layer and the cross section as well as the number of the continuous pores in the base area comprising through openings. In the event that the coating layer encompasses a high flow resistance or a small total cross sectional surface, respectively, of continuous pores, the flow resistance in the fibrous material is to not be too high, because a high total resistance reduces the maximum absorption rate. In the event that the thickness of the coating layer is more than 5 mm, in particular already more than 3 mm, the correspondingly increased flow resistance of the porous layer leads to a smaller maximum absorption rate, to a shift of the maximum towards lower frequencies as well as to a narrowing of the absorption curve. In the event that the portion of the sum of the pore cross sectional surfaces in the case of through openings on the total surface becomes too large (preferably in the event that it is above 25%), the increased absorption shifts towards higher frequencies and thereby evens out the absorption of the fibrous material. In the event that the absorption of the heat exchange surfaces comprising coating layer and fibrous material, which is arranged in the cavity, is thus close to the absorption of the fibrous material without heat exchange surfaces comprising coating layer, the maximum of the absorption rate can be shifted in a desired frequency range of between 125 Hz and 1 kH by reducing the hole portion in the heat exchange surface.

In the case of embodiments comprising two different sound-absorbing sub-faces, namely the heat exchange surfaces and the surfaces located therebetween, different absorption systems can be combined such that the absorption effects in the low (below 250 Hz), average (250 Hz to 1 kHz) and high frequency range (above 1 kHz) are combined such that the absorption coefficient in these ranges is in each case adapted specifically to the respective needs. In the event that the portion of the heat exchange surfaces on the total surface is varied, the heat transfer as well as the sound absorption can be changed, wherein this does not lead to a change of the esthetic appearance due to the continuous coating layer.

The invention will be described in more detail by means of the figures.

FIG. 1 shows a section through a wall assembly,

FIG. 2 shows a top view onto a section of a heat exchange surface, which is formed from an expanded metal and which is coated with a coating layer only in a subregion, FIG. 3 shows a cross section through a metallic sheet material for a heat transfer element, FIG. 4 shows a perspective view of a metallic sheet material for a heat transfer element, FIG. 5 shows a top view onto a metallic sheet material for a heat transfer element, FIG. 6 shows a section from FIG. 3, FIG. 7 shows an illustration of the through openings in the heat exchange surface of the section according to FIG. 6, FIG. 8 shows a cross section through a heat transfer element comprising a metallic sheet material, a cover element, a coating layer and a fibrous material, and FIGS. 9 and 10 show a cross section through a metallic sheet material for a heat transfer element, wherein the metallic sheet material consists of narrow elements.

FIG. 1 shows a room enclosure assembly 1 on a concrete ceiling 2 of a building, wherein said room enclosure assembly can also be embodied on a wall. The concrete ceiling 2 or the wall, respectively, serves as passive or active heat storage. Preferably, non-illustrated pipe coils for a heating or cooling fluid are arranged in the concrete ceiling 2. Due to the temperature difference between a building interior 3, which is bounded by a room enclosure assembly 1, and the concrete ceiling 2, a heat exchange is created between the building interior 3 and the concrete ceiling 2. The room enclosure assembly 1 is designed such that it absorbs acoustic energy, looks optically appealing and attains a heat exchange with large output between the building interior 3 and the concrete ceiling 2.

The bottom side of the concrete ceiling 2 forms a base area 4 of the building structure. A heat-conducting connecting layer 5 is applied onto the base area 4 or subregions thereof by means of an adhesive or mortar. Heat transfer elements 6 are fastened to the concrete ceiling 2 by means of this connecting layer 5. The heat transfer elements 6 in each case encompass a continuous metallic sheet material 7 comprising through openings 8, on which contact surfaces 10 to the base area 4, web faces 11, which lead away from the base area 4, as well as metallic heat exchange surfaces 12, which are spaced apart, form the base area 4, are embodied by means of folding regions 9 or curved regions, respectively.

The metallic heat exchange surfaces 12 are provided with a basic coating layer 13. After the assembly of coated heat transfer elements 6, a cover coating layer 14 can be applied, by means of which joints between the elements are covered and a smooth continuous coating surface is formed. In the case of the preferred embodiments, the entire coating layer is air-permeable after hardening.

In the illustrated embodiment, fibrous material 15 is arranged towards the base area 4 so as to connect to the heat exchange surfaces 12. Said fibrous material is preferably introduced in the form of fiber panel strips in response to or after the forming, respectively, of the metallic sheet material. In the event that the fibrous material 15 is inserted prior to the application of the basic coating layer 13, it can also limit the entry of the coating mass through the through openings 8. If applicable, grainy, flaky or fibrous material is introduced into the cavities only after the assembly of the heat transfer elements 6 on the concrete ceiling 2. It goes without saying that the different cavities can be filled only partially or also completely. Cavities can also be desired for convective heat transfer, wherein provision must then also be made, however, for connections from the building interior 3 to these cavities. The material, the filled cavities and the filling degree is chosen in accordance with the desired acoustic absorption characteristics and in consideration of fire protection regulations.

FIG. 2 shows a section of a heat exchange surface 12, which is formed from an expanded metal and which is coated with a coating layer 14 only in a subregion.

FIGS. 3 to 7 show a metallic sheet material comprising the total width b and a length L for a heat transfer element 6, in the case of which the through openings 8 are embodied only in the region of the heat exchange surfaces 12. The width of the heat exchange surfaces 12 or of the contact surfaces 10, respectively, is identified with 12b or 10b, respectively. Each web face 11 spans an expansion 11b in cross direction. In the illustrated embodiment, the widths of the heat exchange surfaces 12 or of the contact surfaces 10, respectively, thus 12b and 10b have the same size. Different widths 12b and 10b lead to openings of different widths between the heat exchange surfaces 12 and the contact surfaces 10. The difference between the widths 12b and 10b corresponds to maximally twice the expansion 11b, wherein either the heat exchange surfaces 12 or the contact surfaces 10 then connect to one another without interruption or opening, respectively. To attain a substantially continuous total heat exchange surface, the width 12b can be chosen as the sum of width 10b plus twice the width 11b, as is illustrated in FIG. 10.

The thickness of the metallic sheet material 7 is identified with t and the diameter of the through openings 8 is identified with d. FIG. 6 illustrates an angle c, which is larger than 90° and about which the web face 11 must be bent away from the plane comprising the connecting contact surface 10, so that a desired acute angle is embodied between the contact surface 10 and the web face 11. Together with the angle between the contact surface 10 and the web face 11, the width 11b of the web face 11 is chosen such that the distance between the plane comprising the contact surfaces 10 and the plane comprising the heat exchange surfaces 12 corresponds to a desired distance of the coating layer 13 from the base area 4 and thus to a desired thickness D of the cavities between the plane comprising the contact surfaces 10 and the plane comprising the heat exchange surfaces 12. This cavity thickness D is also an important parameter for the sound absorption. Due to the fact that the heat transfer from the contact surfaces to the heat exchange surfaces changes only insignificantly in response to wider web faces, the cavity thickness D can be chosen for a desired sound absorption, without resulting in significant changes for the heat removal.

The heat transfer element 6 according to FIG. 8 comprises metallic sheet material 7, a cover element 16, a coating layer 13 and a fibrous material 15 in all of the cavities between the plane comprising the contact surfaces 10 and the plane comprising the heat exchange surfaces 12, wherein the cover element 16 serves as reinforcement for the coating layer and as continuous application surface for the coating layer.

FIGS. 9 and 10 show a metallic sheet material 7 for a heat transfer element, wherein the metallic sheet material 7 consists of narrow elements 7a. The narrow elements comprise connecting regions 7b, which run parallel to the folding lines 9 on both sides, and by means of which two or more individual elements 7a can be connected to form a continuous metallic sheet material 7 comprising heat exchange surfaces 12, web faces 11 and contact surfaces 10. The illustrated connection of the connecting regions 7b is a positive plug-in connection. It goes without saying that the connection can also be embodied as folded joint or as welded connection or adhesive connection. The connection is embodied such that the function of the heat exchange surfaces 12, web faces 11 and contact surfaces 10 is not impacted and that the assembled element encompasses a sufficient stability and the desired heat transfer characteristic.

The invention claimed is:

1. A room enclosure assembly fastened to a base area of a building structure, said building structure being a concrete ceiling or wall, the room enclosure assembly delimiting an interior of a room, the base area being behind the room enclosure assembly relative to the interior of the room, the room assembly enclosure comprising:
heat exchange surfaces, spaced apart from the base area and coated with a coating layer, where the coating layer is exposed to the interior of the room, including a grain portion with an average grain size in the range of 0.2 to 0.8 mm and having a continuous flat surface extending over a plurality of heat exchange surfaces and regions between the heat exchange surfaces; and
connections between the heat exchange surfaces and the base area, wherein the heat exchange surfaces, and the connections between the heat exchange surfaces and the base area, are formed from a continuous metallic sheet material comprising through openings, wherein the continuous metallic sheet material further comprises contact surfaces to the base area, wherein the connections between the heat exchange surfaces and the base area are web faces which lead away from the base area, wherein folding regions are embodied between sub-faces of the continuous metallic sheet material and wherein the contact surfaces to the base area are fastened to the base area via a heat-conducting connecting layer.

2. The room enclosure assembly of claim 1, wherein the heat exchange surfaces encompass a substantially constant distance to the base area.

3. The room enclosure of claim 1, wherein the total surface of the contact surfaces corresponds at least to one-fourth of the total surface of the heat exchange surfaces.

4. The room enclosure assembly of claim 1, wherein consecutive heat exchange surfaces substantially connect to one another directly or are spaced apart and are connected by a cover element.

5. The room enclosure assembly of claim 1, wherein the continuous metallic sheet material has the through openings only at the heat exchange surfaces, wherein a perforated surface portion on the heat exchange surfaces is between 2 and 30% and the diameter of the through openings is in the range of between 1 and 6 mm.

6. The room enclosure assembly of claim 1, wherein the continuous metallic sheet material includes subcomponents, which comprise connecting regions, which run parallel to the folding regions on both sides of the folding regions, and wherein the connecting regions of interconnected subcomponents are connected to one another in a stable and heat-conducting manner.

7. The room enclosure assembly of claim 1, wherein the material thickness of the continuous metallic sheet material is in a range of between 0.2 mm and 3 mm.

8. The room enclosure assembly of claim 1, wherein the coating layer covers the heat exchange surfaces towards the interior, the coating layer is air-permeable and encompasses a thickness of maximally 10 mm.

9. The room enclosure assembly of claim 1, wherein insulating material is arranged at least in subregions between the plane comprising the heat exchange surfaces and the base area.

10. The room enclosure assembly of claim 1, wherein the heat-conducting connecting layer is an adhesive or mortar.

11. The room enclosure assembly of claim 2, wherein the distance between the heat exchange surface and the base area is in a range of between 10 mm and 80 mm.

12. The room enclosure assembly of claim 2, wherein the distance between the heat exchange surface and the base area is in a range of between 25 mm and 45 mm.

13. The room enclosure of claim 3, wherein the total surface of the contact surfaces corresponds at least to at least half of the total surface of the heat exchange surfaces.

14. The room enclosure of claim 3, wherein the total surface of the contact surfaces corresponds at least two-thirds of the total surface of the heat exchange surfaces.

15. The room enclosure assembly of claim 5, wherein the perforated surface portion on the heat exchange surfaces is essentially 25%, and the diameter of the through openings is essentially 5 mm.

16. The room enclosure assembly of claim 7, wherein the material thickness of the continuous metallic sheet material is in a range of 0.5 mm and 1.8 mm.

17. The room enclosure assembly of claim 7, wherein the material thickness of the continuous metallic sheet material is in essentially 1.5 mm.

18. The room enclosure assembly of claim 9, wherein the insulating material is a fibrous material.

* * * * *